UNITED STATES PATENT OFFICE.

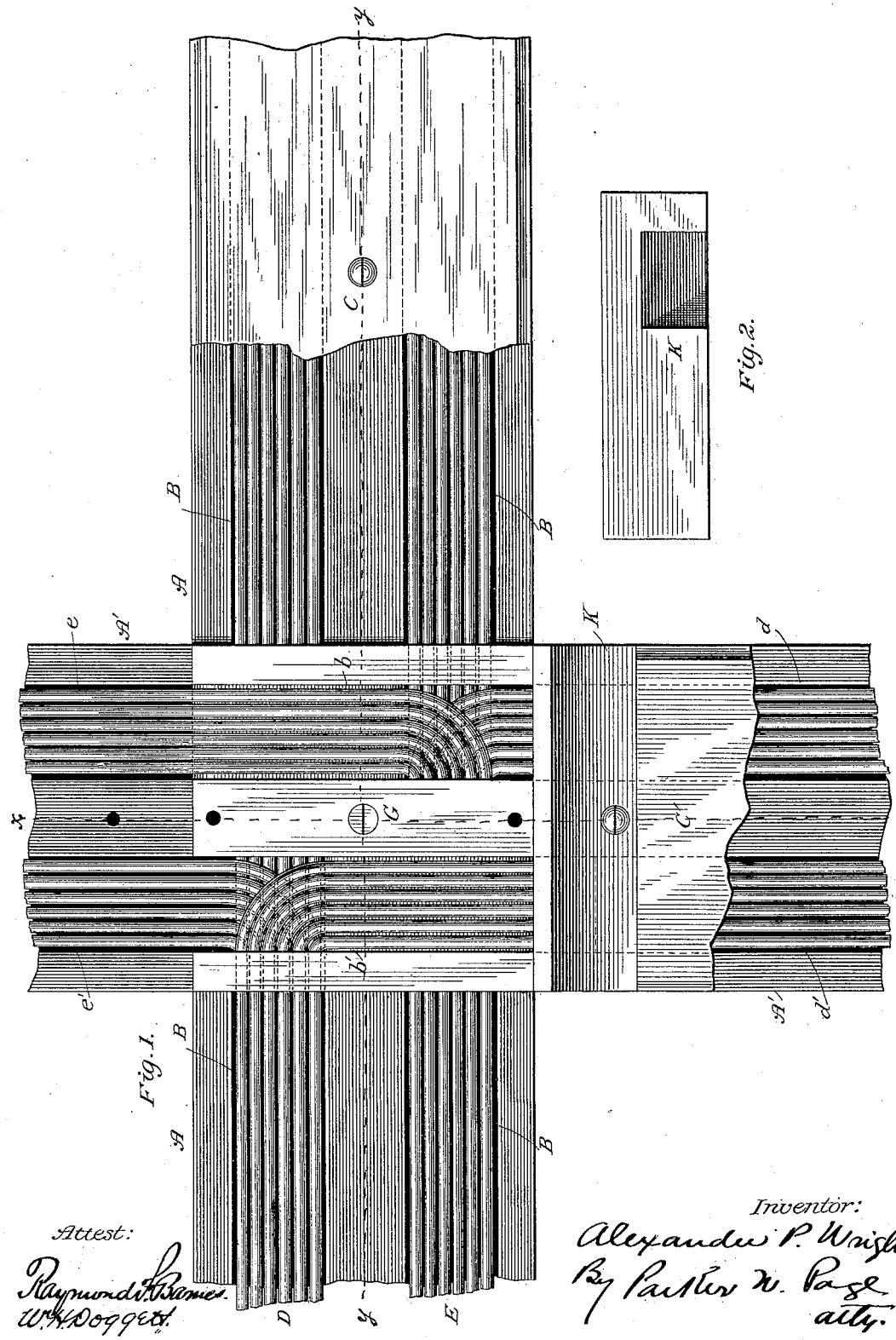

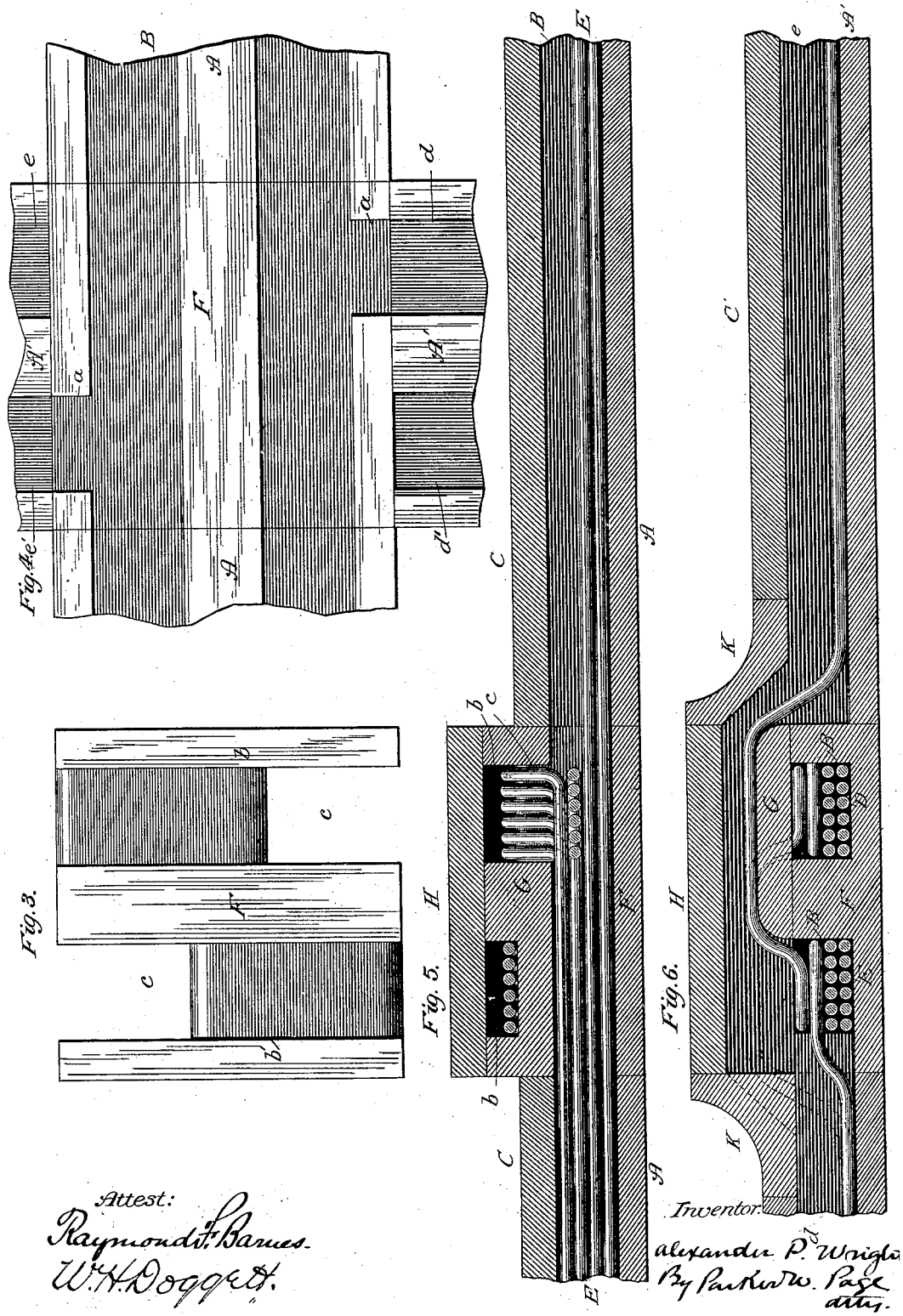

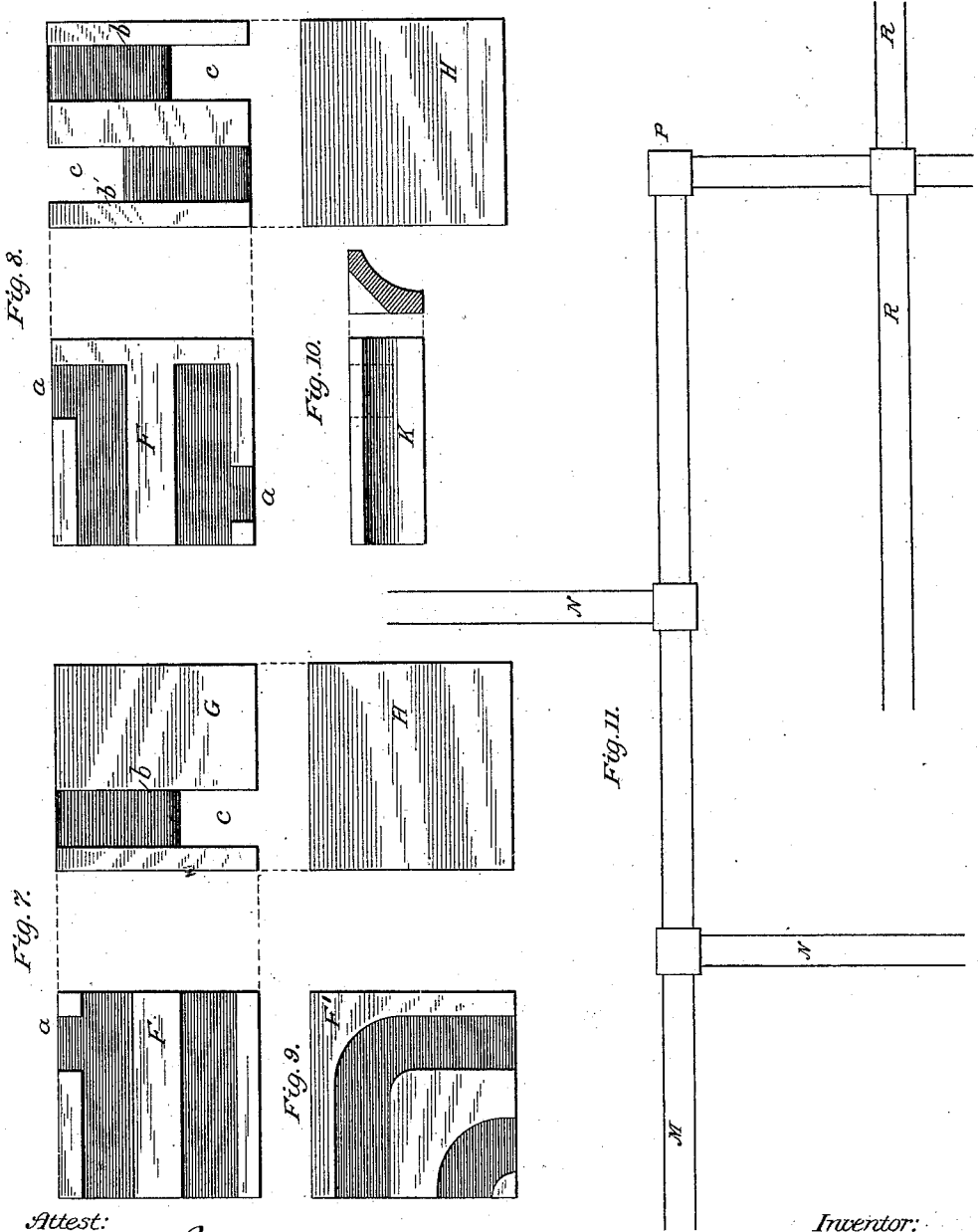

ALEXANDER P. WRIGHT, OF NEWARK, N. J., ASSIGNOR TO THE UNITED STATES ELECTRIC LIGHTING COMPANY, OF NEW YORK, N. Y.

JUNCTION-BOX FOR ELECTRIC CIRCUITS.

SPECIFICATION forming part of Letters Patent No. 297,547, dated April 22, 1884.

Application filed October 4, 1883. (No model.)

*To all whom it may concern:*

Be it known that I, ALEXANDER P. WRIGHT, a subject of the Queen of Great Britain, and a resident of Newark, in the county of Essex and State of New Jersey, have invented certain new and useful Improvements in Junction-Boxes for Electric Circuits, of which the following is a specification, reference being had to the drawings accompanying and forming a part of the same.

My invention relates to systems of electrical distribution in which the current is conveyed by parallel conductors running from the source of electrical supply, and it more particularly relates to those systems in which these conductors are composed of two or more independent wires or bands, of comparatively small size, supported or laid in grooves in an insulating slat or holder. When circuits are run through a building, for instance, the conductors, whether single or composed of an assemblage of small wires, are laid in parallel grooves in slats applied to the walls or ceilings, and covered with another slat ornamented or made to represent an ordinary molding. If it be required to take off from the main conductors at one or more points branch circuits, or from these in turn other branches, it is customary to make use of what are known as "junction-boxes," that facilitate the running of branch circuits at right angles to the main line. When single conductors are used in the mains, the junction-boxes contain various forms of metal connections; but when multiple conductors are used, it is desirable to turn off one or more wires from each group to form the branches. To accomplish this the wire or bundle of wires bent off from one main conductor must be carried over or under the other main conductor, and this has been done heretofore by carefully insulating the branch wire or wires.

The object of my invention is chiefly to provide a ready and easy means of avoiding this, and to facilitate the branching or dividing of circuits which are formed by conductors composed of an assemblage of small wires, strips, or strands. In carrying out my invention, I cut away the upper or inclosing slat of the holder at the point where it is desired to form a branch or branches. In the space thus formed, and over the exposed portion of the under slat or holder, or on a section inserted in place of the same, I then lay a block of wood or other insulating material containing a groove running at right angles to those in the holder, and having a perforation in the groove over one of the grooves in the holder. From the group of wires in this groove I then bend up and over at right angles as many wires as are required for the branch, laying them in the transverse groove in the block. The same number of wires are bent off from the other group before the block is applied, and carried through a notch cut in the holder. A branch is thus formed, one conductor being taken directly off from, say, the positive conductor of the main, the other from the negative and carried over the positive, being completely insulated from it by the grooved block. This latter is then covered by a second block or cap to conceal and protect the wires. This device, by the addition of transverse grooves in the block, may be used for taking off two or more branches at the same point, or for similar purposes, as will be hereinafter described by reference to the drawings, where—

Figure 1 is a view in elevation of a holder for conductors and a junction-box constructed for a double branch, portions of the covering and slats being removed to show the disposition of the wires. Fig. 2 is a part of the cover. Fig. 3 is a plan of a block for double-branch box; Fig. 4, a plan of holders for the main and branch conductors at a double branch: Figs. 5 and 6 are sectional views through a junction-box, the former in a plane indicated by the line $y\,y$ and the latter in the plane of line $x\,x$, Fig. 1. Fig. 7 shows the parts of a junction-box for a single branch; Fig. 8, the construction employed for dividing a main line into two branches. Figs. 9 and 10 represent details of the holder used in the system, and Fig. 11 is a diagram representing the manner of running the branch circuits.

Referring to Fig. 1, A A designate the holder or the slats that are secured to a wall or ceiling; B B, the parallel grooves therein for the reception of the conductors, and C C the covering or ornamental slats that are put on after the conductors are in place to give the holder the appearance of an ordinary molding.

A' A' are slats similar to those designated A A, but are laid at right angles thereto for the purpose of taking off branch circuits.

C' C' are the covers for the holders A' A', and d e the grooves.

D designates one of the conductors of the circuit, E the other, each conductor being composed of a certain number of comparatively fine and flexible wires, strips, or bands. If at a given point it is desired to take off a single branch circuit, the slat C is cut away, leaving the under slat A exposed; or both slats may be cut away and a section, F, Fig. 7, inserted in place of the missing section of the under slat. The requisite number of wires for forming the branch circuit are drawn from one of the grooves B—say that containing the conductor D—and carried off through a notch, a, in the section F into a groove, e, in a branch slat or holder, supposing such a section as shown in Fig. 7 to be inserted at the junction of intersecting holders, as shown in Fig. 4. A block, G, having a groove, b, and a perforation or cut-away portion, c, is then applied over the section F in such manner that the cut-away part c lies directly over the conductor E. The requisite number of strands of this conductor are then drawn out of the groove B and bent over the block G in the groove b and carried off in the groove e' of the branch-holder. A cap, H, is then applied over the block G, and ornamental pieces K fastened at its side to conceal the wires. In this way a branch is formed in which the conductors are completely insulated from one another and from contact with external objects. If a double branch is to be formed, the section F is provided with two notches, one registering with the groove d of the branch-holder on one side of the main line, the other with groove e' on the other side of the main. The block G in this case contains two grooves, b and b', cut through at opposite sides of the block. After a certain number of wires are taken from each groove B through the notches and into the grooves d e', the block G is applied, and the same number of wires taken from each groove B and bent over the block G, and carried down into the grooves e d' of the branch-holders. The cover H and the pieces K are then applied as in the previous case. Two branches are thus formed, each with a conductor from each conductor of the main line, the opposite conductors being entirely insulated and protected.

In lieu of forming double branches, the main conductors may be divided by means of blocks of similar construction, as will be understood by reference to Fig. 8. One conductor, as D, is divided in this case, half being carried out through the notch in the section F, the other half being then bent over the block G. The other conductor, E, is treated in a similar way. When a bend is to be made in the circuit, a section, F', with grooves similar to those shown in Fig. 9, is employed. The arrangement of circuits where these devices are used is shown in Fig. 11.

M designates the main line and holder, N N single branches, P a bend, and R a double branch.

I would state that the method of running circuits which I have described herein by using conductors composed of a number of wires and running off a certain number of such wires to form a branch does not of itself form part of my invention.

I would also state that the devices for forming the branch circuits are not only applicable to holders of the kind described, but may be employed in all cases where parallel conductors are run in substantially the same way.

What I claim is—

1. The combination, with the parallel conductors of an electric circuit, of a grooved holder for containing the main conductors, and a superposed grooved and perforated block for containing branches from the conductors and insulating the same, substantially as herein set forth.

2. The combination, with the parallel conductors of an electric circuit, of the block F, containing grooves and notches, and the superposed block G, containing transverse grooves and perforations, these parts being constructed and combined for forming a branch circuit or circuits in substantially the manner described.

3. The combination, with the grooved holders for the parallel conductors of a main and branch electric circuits, of a section, as F, having notches a, the block G, having transverse grooves, as b, and perforations, and a block or cover, all substantially as set forth.

4. The combination, with the grooved holders A and A' and conductors composed of a number of wires, of a section, as F, with notches a, a block, as G, with transverse grooves and perforations for bending one or more wires from the section F over the block, and a cover for concealing and protecting the wires, all as set forth.

In testimony whereof I have hereunto set my hand this 1st day of October, 1883.

ALEXANDER P. WRIGHT.

Witnesses:
H. A. BECKMEYER,
R. W. BLOEMEKE.